United States Patent [19]

Kameyama

[11] Patent Number: 5,702,336
[45] Date of Patent: Dec. 30, 1997

[54] TOOL MAGAZINE HAVING GRIPS CAPABLE OF MAINTAINING TOOL GRIPPING FORCE REGARDLESS OF ORIENTATION OF MAGAZINE DISK

[75] Inventor: Fumio Kameyama, Nagoya, Japan

[73] Assignee: Brother Kogyo Kabushiki Kaisha, Aichi-ken, Japan

[21] Appl. No.: 659,253

[22] Filed: Jun. 7, 1996

[30] Foreign Application Priority Data

Jun. 23, 1995 [JP] Japan .................................. 7-157421

[51] Int. Cl.$^6$ ............................................... B23Q 3/157
[52] U.S. Cl. .................. 483/56; 483/30; 483/54; 483/59; 483/67; 483/902; 294/87.22; 294/106; 294/115
[58] Field of Search ........................ 483/54, 55, 56, 483/57, 902, 18, 29, 30, 59, 65, 67; 294/87.22, 87.24, 110.1, 110.2, 116, 106, 115

[56] References Cited

U.S. PATENT DOCUMENTS

| | | | |
|---|---|---|---|
| 3,545,804 | 12/1970 | Richner | 294/115 |
| 3,760,490 | 9/1973 | Burg | 483/59 |
| 3,990,140 | 11/1976 | Polacek et al. | 483/31 |
| 4,117,586 | 10/1978 | Uchida et al. | 483/902 |
| 4,377,305 | 3/1983 | Horvath | 294/106 |
| 4,457,659 | 7/1984 | Watanabe | 483/902 |
| 4,845,834 | 7/1989 | Watson | 483/31 |
| 4,914,803 | 4/1990 | Kitamura et al. | 483/67 |
| 5,081,762 | 1/1992 | Kin | 483/44 |
| 5,102,177 | 4/1992 | Dreisig et al. | 294/106 |
| 5,267,766 | 12/1993 | Geissler | 294/116 |
| 5,372,568 | 12/1994 | Matsuoka | 482/56 |

FOREIGN PATENT DOCUMENTS

| | | | |
|---|---|---|---|
| 0585471 A1 | 3/1994 | European Pat. Off. | 483/902 |
| 47-50711 | 12/1972 | Japan | 483/902 |

*Primary Examiner*—Daniel W. Howell
*Assistant Examiner*—Christopher Kirkman
*Attorney, Agent, or Firm*—Oliff & Berridge

[57] ABSTRACT

A tool magazine having a plurality of grips for gripping tool holders for use in a machine tool. The tool holder gripped at the grip is transferred to a holder portion of a spindle of a machine tool, or the tool holder held in the holder portion is transferred to the grip. The magazine has a magazine disk rotatable about a horizontal axis for tool indexing operation. The tool holder extends in the horizontal direction when it is gripped by the grip, and the spindle also extends in the horizontal direction. Each grip includes a pair of first and second arm members pivotally supported on the magazine disk and extending in a radial direction of the magazine disk. The first and second arm members has tool gripping portions movable toward and away from each other for gripping and releasing the tool holder. A compression spring is provided between the pair of first and second arm members for normally urging the first and second arm members to their tool gripping positions. First and second gear portions are provided in meshing relation to the first and second arm members, respectively. If lower side arm member is moved by the weight of the tool holder, the upper side arm member is moved interlockingly and symmetrically to compress the compression spring.

14 Claims, 4 Drawing Sheets

TOOL MAGAZINE HAVING GRIPS CAPABLE OF MAINTAINING TOOL GRIPPING FORCE REGARDLESS OF ORIENTATION OF MAGAZINE DISK

BACKGROUND OF THE INVENTION

The present invention relates to a tool magazine for use in a machine tool and a robot imparted with an automatic tool changing function.

A conventional machine tool and an arm of a robot imparted with an automatic tool changing function is provided with a tool magazine in which a plurality of tools are held. A tool is transferred between the tool magazine and a spindle head of the machine tool so as to change a tool with another tool.

One example of a conventional tool magazine is shown in FIG. 5 in which the tool magazine 15 has a rotatable disk shaped main body, and a plurality of grips 30 are radially arranged on the rotary disk body for gripping a tool holder or a tool. Each of the grips 30 includes a pair of arm members 30a, 30b, and each intermediate portion of the arm member is pivotably supported on a support shaft 31. Between the pair of arm members 30a and 30b, a compression spring 32 is interposed at radially inner side thereof, and therefore, the radially inner sides of the arm members 30a, 30b are biased away from each other. With this biasing arrangement, the radially outer sides of the arm members 30a, 30b are biased toward each other. Therefore, the tool holder 5a can be gripped by the radially outer sides of the arm members 30a, 30b.

However, in the conventional tool magazine, in case the tool magazine is oriented for rotating about a horizontal axis while the grip 30 grips a tool extending in the horizontal direction, the lower arm member 30b is urged to be pivoted about the support shaft 31 in an arm opening direction, i.e., clockwise direction as indicated by an arrow in FIG. 5, and the upper arm member 30a is urged to be pivoted about the support shaft 31 in an arm closing direction, i.e., clockwise direction indicated by an arrow in FIG. 5 due to the weight of the tool. That is, weight of the tool 5a directly applies the radially outer side of the lower arm 30b so that it is pivotally moved in the clockwise direction, which causes the radially inner side of the lower arm 30b to be pivotally moved in the clockwise direction. Therefore, the compression spring 32 is urged to be compressed, and this compression force urges the radially inner side of the upper arm member 30a to be pivotally moved in the clockwise direction. Therefore, the radially outer side of the upper arm ember 30a is pivotally moved in the clockwise direction.

In this way, tool gripping position is shifted downwardly, and as a result, sufficient tool gripping force is not imparted to the tool, and the tool may fall off from the grip 30. If both arm members 30a and 30b are imparted with force in the arm opening direction, the compression spring 32 can produce resistive biasing force for restraining opening of the arm members 30a and 30b. However, in the above described case, the compression spring 32 cannot generate sufficient resistive biasing force.

SUMMARY OF THE INVENTION

It is therefore, an object of the present invention to overcome the above described drawbacks and to provide an improved tool magazine capable of avoiding tool release from the grip.

Another object of the invention is to provide such tool magazine capable of maintaining tool gripping force even if only one of the grip arms is subjected to force directing the arm opening direction by interlockingly applying force directing the arm opening direction with respect to the other grip arm to thereby maintain or increase biasing force of biasing means.

These and other objects of the present invention will be attained by a tool magazine for accommodating a plurality of tools and transferring a selected one of the tool with respect to a spindle of a machine tool, the tool magazine including a magazine disk, at least one grip, a biasing member and interlocking means. The magazine disk is rotatable about a horizontal axis. The at least one grip includes a pair of first and second arm members pivotally supported on the magazine disk and extending in a radial direction of the magazine disk. The first and second arm members have tool gripping portions movable toward and away from each other for gripping and releasing the tool by the pivotal movement of the arm members. The biasing member is provided between the pair of first and second arm members for normally urging the first and second arm members to their tool gripping positions. The interlocking means is provided at the first and second arm members for pivotally and symmetrically moving one of the first and second arm members interlockingly with pivotal movement of the remaining one of the second and first arm members.

In another aspect, in the present invention, there is provided a machine tool including a column, a spindle head, a spindle, and a tool magazine. The column is movable in two dimensional directions in a horizontal plane. The spindle head is movable in a vertical direction. The spindle is supported in the spindle head and has a tool holder portion. The tool magazine is rotatably supported by the column and has at least one grip for accommodating at least one tool and for transferring a tool between the tool holder portion and the grip. The tool magazine has the arrangement described above.

DETAILED DESCRIPTION OF THE PREFERRED EMBODIMENTS

Figure 1:
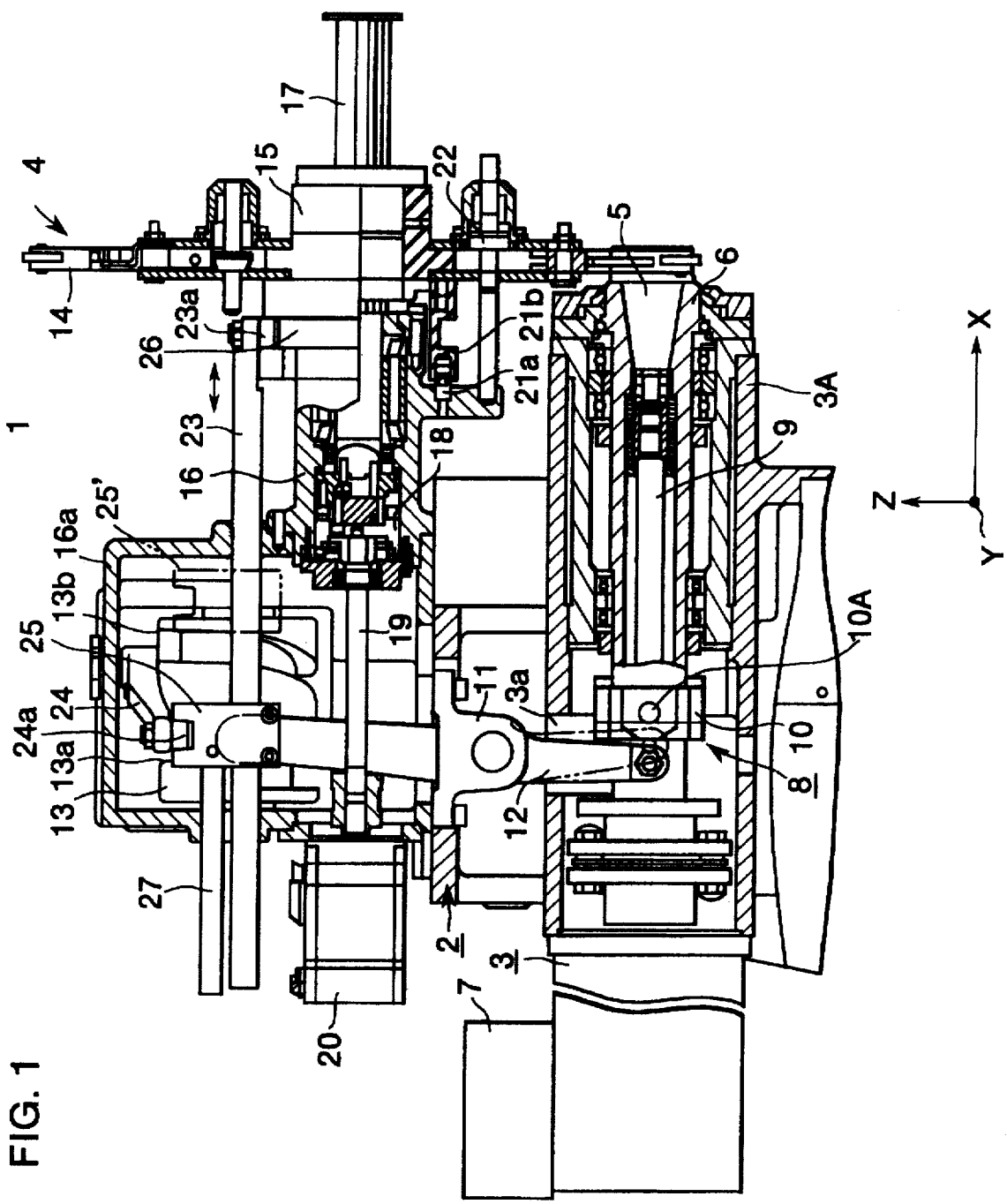
FIG. 1 is a cross-sectional side view showing a machine tool incorporated with a tool magazine according to one embodiment of the present invention.

A tool magazine according to a first embodiment of the invention will be described with reference to FIGS. 1 through 4. A machine tool incorporated with the tool magazine is shown in FIG. 1. The machine tool 1 includes a column 2 movable in X-Y directions in a horizontal plane, a spindle head 3 provided to the column 1 and movable in a vertical direction (Z-direction), and a tool magazine 4 movable in the X-direction with respect to the column 2 and rotatable about a horizontal axis. The column 2 has a ball screw (not shown) for driving the spindle head 3 in the vertical direction. The column 2 also has a magazine support portion 16 for supporting the tool magazine 4. Further, a magazine rotation motor 20 is supported to the column 2.

Figure 4:
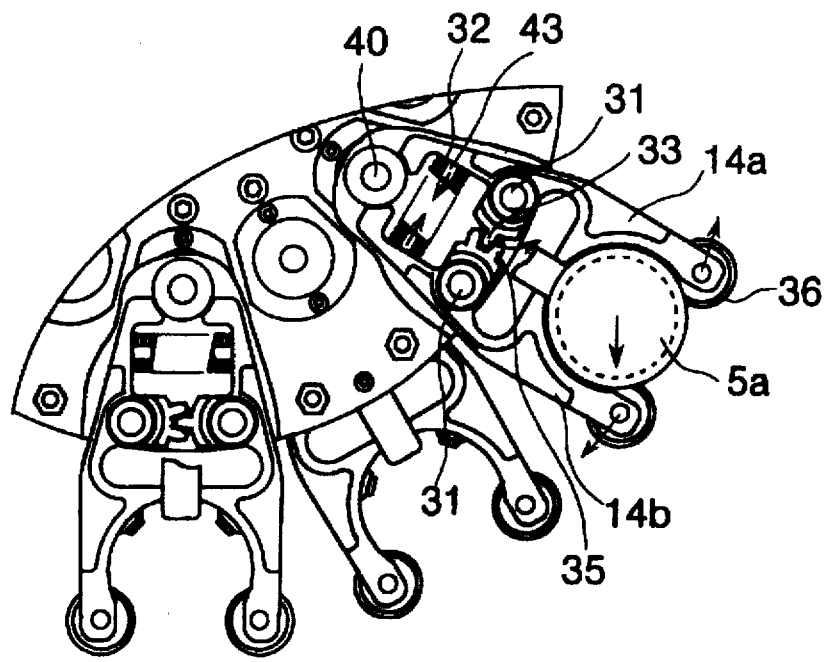
FIG. 4 is an enlarged front view with a part being removed for showing a part of an internal arrangement of the tool magazine according to the embodiment.
Figure 5:
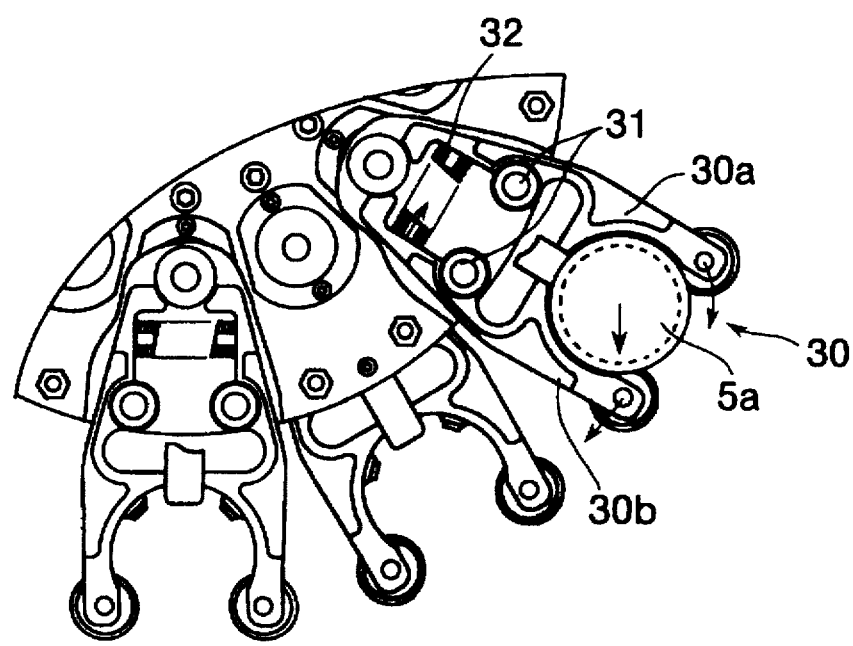
FIG. 5 is an enlarged front view with a part being removed for showing a part of an internal arrangement of a conventional tool magazine.

The spindle head 3 extends in the horizontal direction (X-direction) and has a spindle 6, a spindle motor 7 for drivingly rotating the spindle 6, and a part of an unclamp mechanism 8 for unclamping the tool. Incidentally, the tool is combined with a tool holder 5a (FIG. 4). The spindle head 3 has an outer sleeve portion 3A for covering the spindle 6 and is formed with an upper opening 3a. The spindle 6 has a hollow portion and has a tip end portion provided with a holder portion 5 for clamping the tool holder 5a (FIG. 4). When a tool holder 5a is clamped by the tool holder portion 5, a tool extends in the horizontal direction so that the machine tool 1 can perform machining to a workpiece (not shown) in the horizontal direction. The tool magazine 4 is adapted to perform automatic tool changing operation with respect to the spindle head 3.

The unclamp mechanism 8 includes a rod 9, an unclamp ring 10, an unclamp lever 12, and a cam 13. The rod 9 and unclamp ring 10 are provided to the spindle head 3, whereas the unclamp lever 12 and the cam 13 are provided to the column 2. The rod 9 extends through the hollow portion of the spindle 6 and in parallel therewith. The rod 9 is urged by a unclamp spring (not shown) and is axially movable in the hollow portion. The unclamp ring 10 is fitted over the spindle 6 and is connected to a rear end portion of the rod 9 by a pin 10A. The unclamp lever 12 is pivotally supported to a support stand 11 of the column 2. The cam 13 is adapted to pivot the unclamp lever 12 within a predetermined angle.

The unclamp lever 12 has an upper end shown by broken line in FIG. 1 which is engaged with an unclamp cam groove 13a of the cam 13. By the rotation of the cam 13, the unclamp lever 12 is pivotally moved. The unclamp lever 12 has a lower portion extends into the spindle head 3 through the upper opening 3a of the outer sleeve 3A. The lower portion of the unclamp lever 12 is abutable with a side end face of the unclamp ring 10 when the spindle head 3 is moved upwardly. With this state, if the unclamp lever 12 is pivoted to a position indicated by a two dotted chain line in FIG. 1 by the rotation of the cam 13, the unclamp ring 10 is pushedly moved frontwardly, so that the tool clamping state at the holder portion 5a is released.

Figure 2:
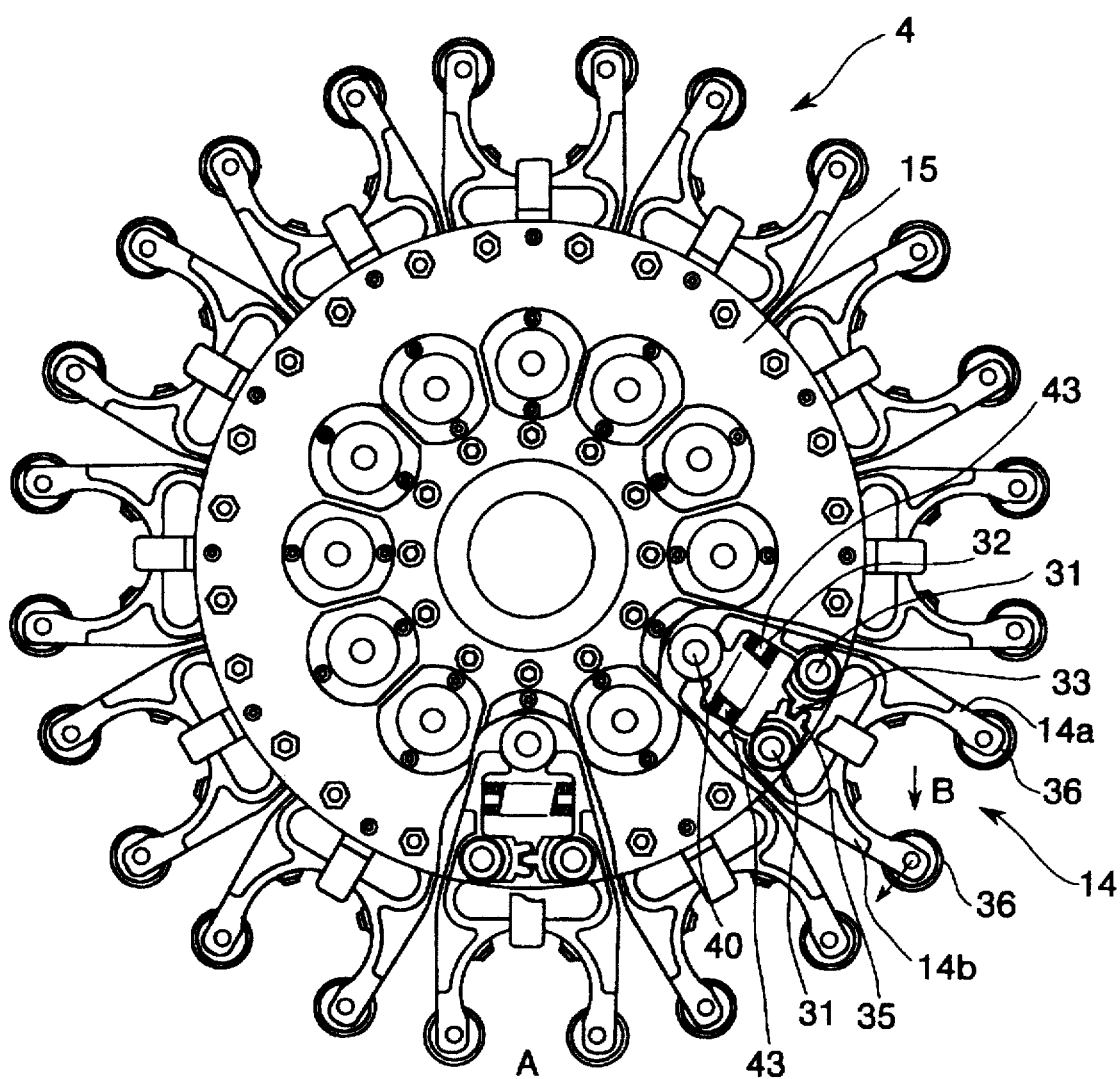
FIG. 2 is a front view showing the tool magazine of the present embodiment.
Figure 2:
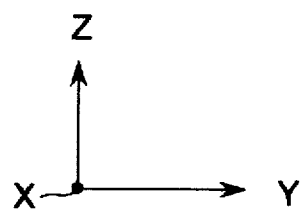
Figure 3:
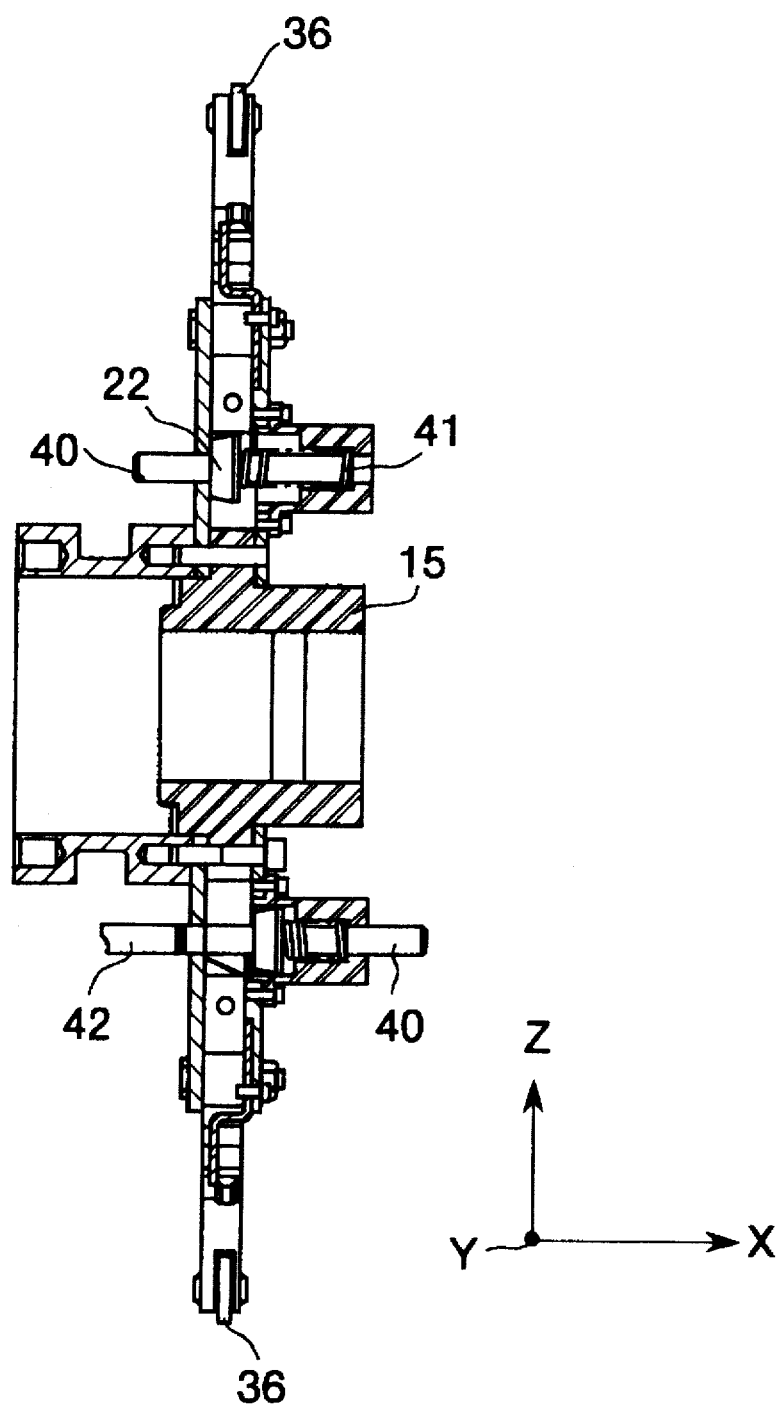
FIG. 3 is a cross-sectional side view showing the tool magazine.

The details of the tool magazine 4 is shown in FIGS. 2 through 4. The tool magazine 4 includes a magazine disk 15 in which a plurality of grips 14 are radially arranged each for gripping a tool holder 5a. The magazine disk 15 is supported by a rotation shaft 17 rotatably supported to the magazine support portion 16 of the column 2. Thus the major surface of the magazine disk is on a vertical plane, and the magazine disk 15 is rotatable about the horizontal axis of the rotation shaft 17. The rotation shaft 17 has a spline, so that the magazine disk 15 is rotatable together with the rotation of the rotation shaft 17 and can be movable in the horizontal direction along the rotation shaft 17. The rotation shaft 17 is connected to a magazine rotation motor 20 through a drive shaft 19 and a speed reduction gear mechanism 18.

Each grip 14 for gripping each tool holder 5a (FIG. 4) includes a pair of arm members 14a, 14b whose intermediate portions are pivotally supported to pivot shaft 31, 31, respectively, fixed to the magazine disk 15. The arm members 14a, 14b are pivotally movable, so that their radially outer end portions are moved toward and away from each other for closing and opening movement. The radially outer end portions of the arm members 14a, 14b serve as a gripping portion for gripping the tool holder 5a. For facilitating the gripping and releasing the tool holder 5a, a roller 36 is rotatably provided at each radially outer end of the arm members 14a, 14b. The radially inner portions of the arm members 14a, 14b are provided with projections 43, 43 protruding toward each other in a circumferential direction of the magazine disk 15. A biasing member such as a compression spring 32 is provided between the radially inner portions of the arm members 14a, 14b. That is, each end of the compression spring 32 is seated on the projection 43. Therefore, the arm members 14a, 14b is normally biased to its close position.

Around the pivot shafts 31, 31 and at confronting sides of the arm members 14a and 14b, gear portions 33, 35 are provided. To be more specific, the arm member 14a has the gear portion 33 having a single tooth, and the arm member 14b has the gear portion 35 having two teeth engageable with the gear tooth 33. Each rotational center of the gear portion 33, 35 is on an rotation axis of the pivot shaft 31, that is, on a longitudinal axis of the arm member 14a, 14b.

The magazine supporting portion 16 has a positioning pin 21a at a position in confrontation with the magazine disk 15 for stopping the rotation of the magazine disk 15 at a predetermined rotational index position. To this effect, in the magazine disk 15, a plurality of positioning holes 21b are formed at positions in confrontation with the magazine supporting portion 16. The numbers of the positioning holes 21a are equal to the numbers of the plurality of grips 14, and a position of each positioning hole 21b corresponds to the position of each grip 14. When the position-indexed magazine disk 15 is moved to its retracted position for changing a tool with another tool, the positioning pin 21a is brought into engagement with one of the positioning holes 21b for accurately positioning the magazine disk 15 at its given angular rotational position.

The magazine disk 15 has a plurality of lock pins 40 each extending in the X-direction and movable in its axial direction. The numbers of the lock pins 40 is equal to the numbers of the grip pairs 14. Each axially intermediate portion of the lock pin 40, there is provided a ring member 22 having a tapered configuration. The ring member 22 is normally biased by a spring 41 to a position between the radially inner end portions of the arm members 14a, 14b as shown in an upper part of FIG. 3 so as to lock the arm members 14a, 14b at their given pivotal positions.

The magazine support portion 16 has a release pin 42 for releasing the locking of the arm members 14a, 14b only at a predetermined rotational position of the magazine disk 15, the predetermined rotation position being tool changing position, etc. The release pin 42 is aligned with the lock pin and abutable on the lock pin 40 when the magazine disk 15 is moved rearwardly, i.e., leftwardly in FIG. 1. By this abutment, the ring member 22 is offset from the arm members 14a, 14b, so that the radially inner ends of the arm members 14a, 14b can be moved toward each other. Incidentally, the lower half part in FIG. 2 shows the releasing state in which the ring member 22 is moved rightwardly against the biasing force of the spring 41. There are two lock-releasing positions A and B as shown in FIG. 2. In the position A, a tool holder 5a is automatically attached to or detached from the holder portion 5 of the spindle 6, and in the position B, the tool holder 5a is manually attached to or detected from the gripping portion of the grip 14.

A mechanism for moving the magazine disk 15 in the X direction, i.e., rightward and leftward direction in FIG. 1 is provided. This mechanism includes a frontwardly and rearwardly movable shaft 23 and a frontwardly and rearwardly movable lever 24. The magazine support portion 16 has a cam base 16a to which the movable shaft 23 is movably supported in the X direction. The lever 24 is adapted to move the shaft 23 in the X-direction, and is pivotally supported to a top wall of the cam base 16a. One end of the lever 24 has a cam follower (not shown) engaged with a cam groove 13b of the cam 13 for the frontward and rearward movement. Another end of the lever 24 is provided with a cam follower 24a engageable with a cam piece 25 coupled to the shaft 23. The front end of the shaft 23 has a cam follower 23a engageable with a cam groove 26 of the magazine disk 15, so that frontward and rearward movement of the shaft 23 is transmitted to the magazine disk 15.

The cam 13 having the cam groove 13a for unclamping the tool holder 5a and the cam groove 13b for moving the shaft 23 in the frontward and rearward directions is connected to a cam drive motor (not shown) through a cam shaft 27. A cam sensor (not shown) is provided for detecting an angular rotational position of the cam 13. The cam drive motor is controlled based on a signal from the cam sensor. By the rotation of the cam 13, the magazine disk 15 is moved frontwardly or rearwardly by way of the lever 24 and the shaft 23. In FIG. 1, a frontmost position of the cam piece 25 is shown by a two dotted chain line.

With this structure, if automatic tool changing operation is started, the spindle head 3 is moved to its ascent position, so that the unclamp lever 12 is brought into abutment with the unclamp ring 10. In this instance, the tool holder 5a clamped by the holder portion 5 of the spindle 6 is gripped by the grip 14 of the tool magazine 4. Then, the cam drive motor is driven, so that the cam 13 is rotated through the cam shaft 27. By the rotation of the cam 13, the unclamp lever 12 is pivotally moved with respect to the support stand 11 because the cam follower provided at the upper end of the unclamp lever 12 is engaged with the unclamp cam groove 13a. Therefore, the cam follower provided at the lower end of the unclamp lever 12 pushes the side face of the unclamp ring 10, so that the rod 9 is moved frontwardly against the biasing force of the unclamp spring. Thus, the tool holder 5a is released from the holder portion 5a of the spindle 6.

Then, the lever 24 is moved because of the engagement of the cam follower at one end of the lever 24 with the cam groove 13b. Therefore, the other cam follower 24a provided at the other end of the lever 24 pushes the cam piece 25 frontwardly, and as a result, the shaft 23 is moved frontwardly. Consequently, the magazine disk 15 is moved frontwardly because of the engagement of the cam follower 23a with the cam groove 26. Thus, the tool holder 5a is pulled out of the holder portion 5 of the spindle 6.

Thereafter, the magazine drive motor 20 is rotated, so that the magazine disk 15 is angularly rotated about the horizontal axis of the rotation shaft 17 through the speed reduction gear mechanism 18 and the spline of the rotation shaft 17 for indexing another tool holder 5a. Upon completion of the indexing, the cam drive motor is reversely driven for reversely rotating the cam 13. Accordingly, new tool holder 5a can be clamped to the holder portion 5 in a sequential operations with a reverse order. That is, the magazine disk 15 is moved rearwardly, so that the new tool holder 5a is transferred to the holder portion 5 of the spindle 6, and then the tool holder 5a transferred to the holder portion 5 is subjected to clamping by the rearward movement of the rod 9.

Next, the operation of the grip 14 will be described. The radially outer portions of the arm members 14a, 14b are urged toward each other, i.e., toward closing position, by the biasing force of the compression spring 32 as described above for gripping the tool holder 5a. When the grip 14 is brought to the position B in FIG. 2 by the rotation of the magazine disk 15, manual tool replacement is performed. That is, the tool holder 5a held in the grip 14 is manually detached from the grip 14, and another tool holder 5a is attached to the grip 14. For this work, locking state of the close position of the arm members 14a and 14b must be released. To this effect, the ring member 22 is moved away from the arm members 14a and 14b, and therefore, the radially inner ends of the arm members 14a and 14b can be moved toward each other.

In this state, the lower arm member 14b is subjected to the weight of the tool holder 5a, so that the lower arm member 14b is urged to its opening direction. However, because the gear portion 33 of the upper arm member 14a is engaged with the gear portion 35 of the lower arm member 14b, the upper arm member 14a is also urged to be pivoted to its opening direction by the pivoting amount equal to that of the lower arm member 14b because of the rotation of the gear portion 33 about an axis of the support shaft 31.

Because both the upper and lower arm members 14a and 14b are urged to be rotated in the opening direction, the compression spring 32 is subjected to increased compression force, and therefore, the compression spring 32 will generate increased biasing or repulsive force. This increased force of the spring 32 will prevent the upper and lower arm members 14a and 14b from being largely moved to their opening direction. Consequently, tool holder 5a can still be gripped by the grip 14 without falling off therefrom.

In this way, even if the locking state of the close position of the arm members 14a and 14b is released by moving the ring member 22 away from the radially inner ends of the arm members 14a and 14b, the arm members 14a and 14b can hold the tool holder 5a by the increased biasing force of the compression spring 32. If the tool holder 5a is to be manually pulled off from the grip 14, the tool holder 5a is simply pulled in a radially outward direction in FIG. 2, so that both upper and lower arm members 14a and 14b are pivotally moved symmetrically against the biasing force of the coil spring 32. However, even if the pulling out direction of the tool holder 5a is offset from the radial direction, both upper and lower arm members 14a and 14b can be moved symmetrically because of the meshed engagement between the gear portions 33 and 35. Therefore, the tool holder 5a can be smoothly pulled off from the grip 14 in order to perform tool replacement work at the position B.

While the invention has been described in detail and with reference to the specific embodiment thereof, it would be apparent to those skilled in the art that various changes and modifications may be made therein without departing from the spirit and scope of the invention. For example, in the illustrated embodiment, the arm member 14a has a single gear tooth 33 and the arm member 14b has two gear teeth 35. However, the teeth number is not limited to the number in the illustrated embodiment.

What is claimed is:

1. A tool magazine for accommodating a plurality of tools and transferring a selected one of the tools with respect to a spindle of a machine tool, the tool magazine comprising:

a magazine disk rotatable about a horizontal axis;

at least one grip comprising a pair of first and second arm members pivotally supported on the magazine disk and extending in a radial direction of the magazine disk, the first and second arm members having tool gripping portions movable toward and away from each other for gripping and releasing the tool by the pivotal movement of the arm members;

a biasing member provided between the pair of first and second arm members for normally urging the first and second arm members to their tool gripping positions; and interlocking means provided at the first and second arm members for pivotally and symmetrically moving one of the first and second arm members interlockingly with pivotal movement of the remaining one of the second and first arm members.

2. The tool magazine as claimed in claim 1, wherein the interlocking means comprises pair of first and second gear portions meshedly engaged with each other, the first gear portion being provided at the first arm member and the second gear portion being provided at the second arm member.

3. The tool magazine as claimed in claim 2, wherein each first and second arm member has an intermediate portion pivotally supported at the magazine disk, each first and second arm members having a radially outer portion, a radially outer end, a radially inner portion and a radially inner end with respect to the intermediate portion, the tool gripping portions of the first and second arm members being provided at confronting surfaces of the radially outer portions, and wherein the biasing member is interposed between confronting surfaces of the radially inner portions of the first and second arm members.

4. The tool magazine as claimed in claim 3, wherein rotation axes of the first and second gears are on longitudinal axes of the first and second arm members.

5. The tool magazine as claimed in claim 4, further comprising a lock pin movable in an axial direction thereof, the radially inner ends of the first and second arm members being abutable on the lock pin when the lock pin is moved to a first position for preventing the radially outer ends of the first and second arm members from moving away from each other, the radially inner ends being out of contact with the lock pin when the lock pin is moved to a second position for allowing one of the radially outer ends of the first and second arm members to move away from the other.

6. The tool magazine as claimed in claim 5, further comprising rollers each provided rotatably at the radially outer end of the arm member.

7. The tool magazine as claimed in claim 5, further comprising a pair of projections projecting from the confronting surfaces of the radially inner portions of the arm members toward each other, and wherein the biasing member comprises a compression coil spring having two ends, one end of the compression spring being seated on one of the projections and the other end of the compression spring being seated on the other projection.

8. A machine tool comprising:

a column movable in two dimensional directions in a horizontal plane;

a spindle head movable in a vertical direction;

a spindle supported in the spindle head and having a tool holder portion;

a tool magazine rotatably supported by the column and having at least one grip for accommodating at least one tool and for transferring a tool between the tool holder portion and the grip, the tool magazine comprising:

a magazine disk rotatable about a horizontal axis;

the at least one grip comprising a pair of first and second arm members pivotally supported on the magazine disk and extending in a radial direction of the magazine disk, the first and second arm members having tool gripping portions movable toward and away from each other for gripping and releasing the tool by the pivotal movement of the arm members;

a biasing member provided between the pair of first and second arm members for normally urging the first and second arm members to their tool gripping positions; and interlocking means provided at the first and second arm members for pivotally moving one of the first and second arm members interlockingly with pivotal movement of the remaining one of the second and first arm members.

9. The machine tool as claimed in claim 8, wherein the interlocking means comprises a pair of first and second gear portions meshedly engaged with each other, the first gear portion being provided at the first arm member and the second gear portion being provided at the second arm member.

10. The machine tool as claimed in claim 9, wherein each first and second arm member has an intermediate portion pivotally supported at the magazine disk, each first and second arm members having a radially outer portion, a radially outer end, a radially inner portion and a radially inner end with respect to the intermediate portion, the tool gripping portions of the first and second arm members being provided at confronting surfaces of the radially outer portions, and wherein the biasing member is interposed between confronting surfaces of the radially inner portions of the first and second arm members.

11. The machine tool as claimed in claim 10, wherein rotation axes of the first and second gears are on longitudinal axes of the first and second arm members.

12. The machine tool as claimed in claim 11, further comprising a lock pin movable in an axial direction thereof, the radially inner ends of the first and second arm members being abuttable on the lock pin when the lock pin is moved to a first position for preventing the radially outer ends of the first and second arm members from moving away from each other, the radially inner ends being out of contact with the lock pin when the lock pin is moved to a second position for allowing one of the radially outer ends of the first and second arm members to move away from the other.

13. The machine tool as claimed in claim 12, further comprising rollers each provided rotatably at the radially outer end of the arm member.

14. The tool magazine as claimed in claim 13, further comprising a pair of projections projecting from the confronting surfaces of the radially inner portions of the arm members toward each other, and wherein the biasing member comprises a compression coil spring having two ends, one end of the compression spring being seated on one of the projections and the other end of the compression spring being seated on the other projection.

* * * * *